United States Patent [19]
Matusevich

[11] Patent Number: 6,119,016
[45] Date of Patent: Sep. 12, 2000

[54] SYNCHRONIZING BASE STATIONS IN A WIRELESS TELECOMMUNICATIONS SYSTEM

[75] Inventor: Alex Matusevich, Morris Plains, N.J.

[73] Assignee: Lucent Technologies, Inc., Murray Hill, N.J.

[21] Appl. No.: 09/095,173

[22] Filed: Jun. 10, 1998

[51] Int. Cl.[7] ............................ H04R 17/00; H04Q 7/14; H04L 7/00; H03D 3/24
[52] U.S. Cl. ........................ 455/502; 455/502; 455/67.6; 375/219; 375/355; 375/358; 375/376
[58] Field of Search ................................. 455/502, 67.6; 370/328, 503, 350; 375/219, 220, 354, 358, 356, 355, 376

[56] References Cited

U.S. PATENT DOCUMENTS

| 4,411,007 | 10/1983 | Rodman et al. | 375/107 |
|---|---|---|---|
| 5,062,124 | 10/1991 | Hayashi et al. | 375/107 |
| 5,201,061 | 4/1993 | Goldberg et al. | 455/51.2 |
| 5,404,575 | 4/1995 | Lehto | 455/51.1 |
| 5,555,213 | 9/1996 | DeLong | 326/93 |
| 5,592,474 | 1/1997 | Tanaka | 370/350 |
| 5,608,765 | 3/1997 | Tanoue | 375/365 |
| 5,631,590 | 5/1997 | Tomesakai | 327/156 |
| 5,873,044 | 2/1999 | Goldberg et al. | 455/503 |
| 5,920,557 | 7/1999 | Hirata | 370/350 |

Primary Examiner—Daniel S. Hunter
Assistant Examiner—Meless Zewdu
Attorney, Agent, or Firm—DeMont & Breyer, LLC; Jason Paul DeMont; Wayne S. Breyer

[57] ABSTRACT

A technique for synchronizing the timing signals in the base stations of a wireless telecommunications system is disclosed. In accordance with the illustrative embodiment of the present invention, each base station derives the frequency of its timing signal from one periodic signal, but the phase of its timing signal from a second periodic signal. In general, the base station derives its timing signal based on: (1) the frequency of a reference timing signal, and (2) the phase of a feedback signal. The reference timing signal can be obtained from a common timing source or from different timing sources which are designed to have the same frequency. The feedback signal is advantageously the confluence of two feedback loops. In accordance with the first feedback loop, the feedback signal is based on the phase of the base station's own timing signal. In accordance with the second feedback loop, the feedback signal is based on the phase of the timing signals from one or more nearby base stations. Advantageously, the feedback signal is based on the Boolean AND or NAND function of the base station's own timing signal and the timing signals of the nearby base stations.

18 Claims, 5 Drawing Sheets

100

SYNCHRONIZING BASE STATIONS IN A WIRELESS TELECOMMUNICATIONS SYSTEM

FIELD OF THE INVENTION

The present invention relates to telecommunications in general, and, more particularly, to a technique for synchronizing the timing signals of base stations in a wireless telecommunications system.

BACKGROUND OF THE INVENTION

FIG. 1 depicts a schematic diagram of a portion of a wireless telecommunications system in the prior art, which system provides wireless telecommunications service to a number of wireless terminals (e.g., wireless terminals 101-1 through 101-3) that are situated within a geographic region. The heart of a wireless telecommunications system is a wireless switching center ("WSC"), which also may be known as a mobile switching center or mobile telephone switching office. Typically, a wireless switching center (e.g., WSC 120) is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). A wireless switching center is responsible for, among other things, establishing and maintaining a call between a first wireless terminal and a second wireless terminal or, alternatively, between a wireless terminal and a wireline terminal (e.g., wireline terminal 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with the wireless switching center.

For example, when a user of wireless terminal 101-1 desires to transmit information to a user of wireless terminal 101-2, wireless terminal 101-1 transmits a data message bearing the user's information to base station 103-1. The data message is then relayed by base station 103-1 to wireless switching center 120 via wireline 102-1. Because wireless terminal 101-2 is in the cell serviced by base station 103-1, wireless switching center 120 returns the data message back to base station 103-1, which relays it to wireless terminal 101-2.

Each wireless terminal and each base station comprises a timing signal that it uses for timing its communications with the other. Typically, the timing signal does not provide the exact time (e.g., 3:18 A.M.), but is a waveform with a constant frequency that establishes a cadence for the wireless terminals and base stations to follow.

The ease with which a wireless terminal and a base station can communicate is dependent on the degree to which the timing signal in the wireless terminal and the timing signal in the base station are synchronized. In other words, if the timing signal in the wireless terminal and the timing signal in the base station are not synchronized, communication between the wireless terminal and the base station may be difficult or impossible.

The degree of synchronization of two or more timing signals is not definable by a single parameter. Instead, the degree of synchronization is defined by two parameters: (1) frequency, and (2) phase. To illustrate the relationship and meaning of these two parameters, FIGS. 2 through 4 depicts graphs of pairs illustrative timing signals.

FIG. 2 depicts a graph of two timing signals that are not synchronized because they have different frequencies. In contrast, FIG. 3 depicts a graph of two timing signals that have the same frequency, but are still not synchronized because they have different phases. And finally, FIG. 4 depicts a graph of two timing signals that are synchronized because they have the same frequency and the same phase. In general, for a wireless terminal and a base station to be able to communicate, the timing signal in the wireless terminal and the timing signal in the base station must have the same frequency and nearly the same phase.

It is well known in the prior art how to synchronize a timing signal in a wireless terminal and a timing signal in a base station. In accordance with one technique, the base station transmits its timing signal to the wireless terminal. Periodically or sporadically or continually, the wireless terminal uses the timing signal from the base station to synchronize its own timing signal. Because the base station directs the wireless terminal to synchronize its timing signal to that of the base station, but the base station does not synchronize its timing signal to that of the wireless terminal, the relationship of the base station and the wireless terminal is asymmetric. In particular, the base station acts like a master and the wireless terminal acts like a slave.

There are occasions when a wireless terminal needs to communicate with two or more base stations simultaneously or in relatively short succession. In this case, the timing signal in the wireless terminal is advantageously synchronized with the timing signals in all of the base stations with which it communicates. By implication, this requires that the timing signals in all of the base stations be synchronized with each other. In other words, when a wireless terminal needs to communicate with two or more base stations, the timing signal in the wireless terminal needs to be synchronized with the timing signals in all of the base stations, and all of the base stations' timing signals need to be synchronized with each other. To accomplish this, the base stations synchronize their timing signals with each other and the wireless terminal synchronizes its timing signal with that of one of the base stations.

There are two techniques in the prior art for synchronizing the timing signals of multiple base stations.

In accordance with the first technique, each base station comprises an independent but highly-accurate timing source, such as a cesium clock whose rate of vibration is well-known and very stable under a wide range of environmental conditions. This technique is advantageous because it effectively ensures that each base station's timing signals are synchronized in frequency. This technique is disadvantageous, however, because the independence of the timing sources does nothing to synchronize the timing signals in phase. Therefore, this technique is bound to produce timing signals that are synchronized in frequency, but not phase, such as those shown in FIG. 3.

In accordance with the second technique, all of the base stations derive their timing signals from a reference timing signal that is transmitted from a single timing source. Typically, the timing source is located in a wireless switching center and the reference timing signal is transmitted to each base station via the wireline associated with that base station. Like the first technique, the second technique is advantageous because it effectively ensures that each base station's timing signals are synchronized in frequency. Also like the first technique, the second technique is disadvantageous because the base stations' timing signals are not synchronized in phase.

The reason has to do with geography. Because not all of the base stations are equidistant from the common master timing signal, the reference timing signal must traverse a different distance from the timing source to each base station. And because the reference timing signal propagates from the timing source to each base station at the same velocity, the reference timing signal arrives at each base station at a slightly different time. The arrival of the timing signal at each base station at a slightly different time exhibits itself as a phase disparity in the respective timing signals at the base stations.

Therefore, the need exists for a technique for synchronizing the timing signals in the base stations of a wireless telecommunications system, in both frequency and phase, without some of the costs and disadvantages of techniques in the prior art.

SUMMARY OF THE INVENTION

The present invention is a wireless telecommunications system that is capable of synchronizing the timing signals in the base stations of a wireless telecommunications system, in both frequency and phase.

In accordance with the illustrative embodiment of the present invention, each base station derives the frequency of its timing signal from one periodic signal, but the phase of its timing signal from a second periodic signal. In general, the base station derives its timing signal based on: (1) the frequency of a reference timing signal, and (2) the phase of a feedback signal. In particular, the base station accomplishes this by phase aligning the reference timing signal to a feedback signal to create the base station's timing signal.

The reference timing signal can be obtained from a common timing source or from different timing sources which are designed to have the same frequency.

The feedback signal is advantageously the confluence of two feedback loops. In accordance with the first feedback loop, the feedback signal is based on the phase of the base station's own timing signal. In accordance with the second feedback loop, the feedback signal is based on the phase of the timing signals from one or more nearby base stations. Advantageously, the feedback signal is based on the Boolean AND or NAND function of the base station's own timing signal and the timing signals of the nearby base stations.

The use of two feedback loops is advantageous because it enables the base stations to achieve and maintain synchronization automatically, even if there are changes in the reference timing signals or the timing signals of one or more base stations. When each base station in the illustrative embodiment follows this regimen, each base station's timing signal becomes synchronized in both frequency and phase with the timing signals of the nearby base stations.

DETAILED DESCRIPTION

Figure 1:
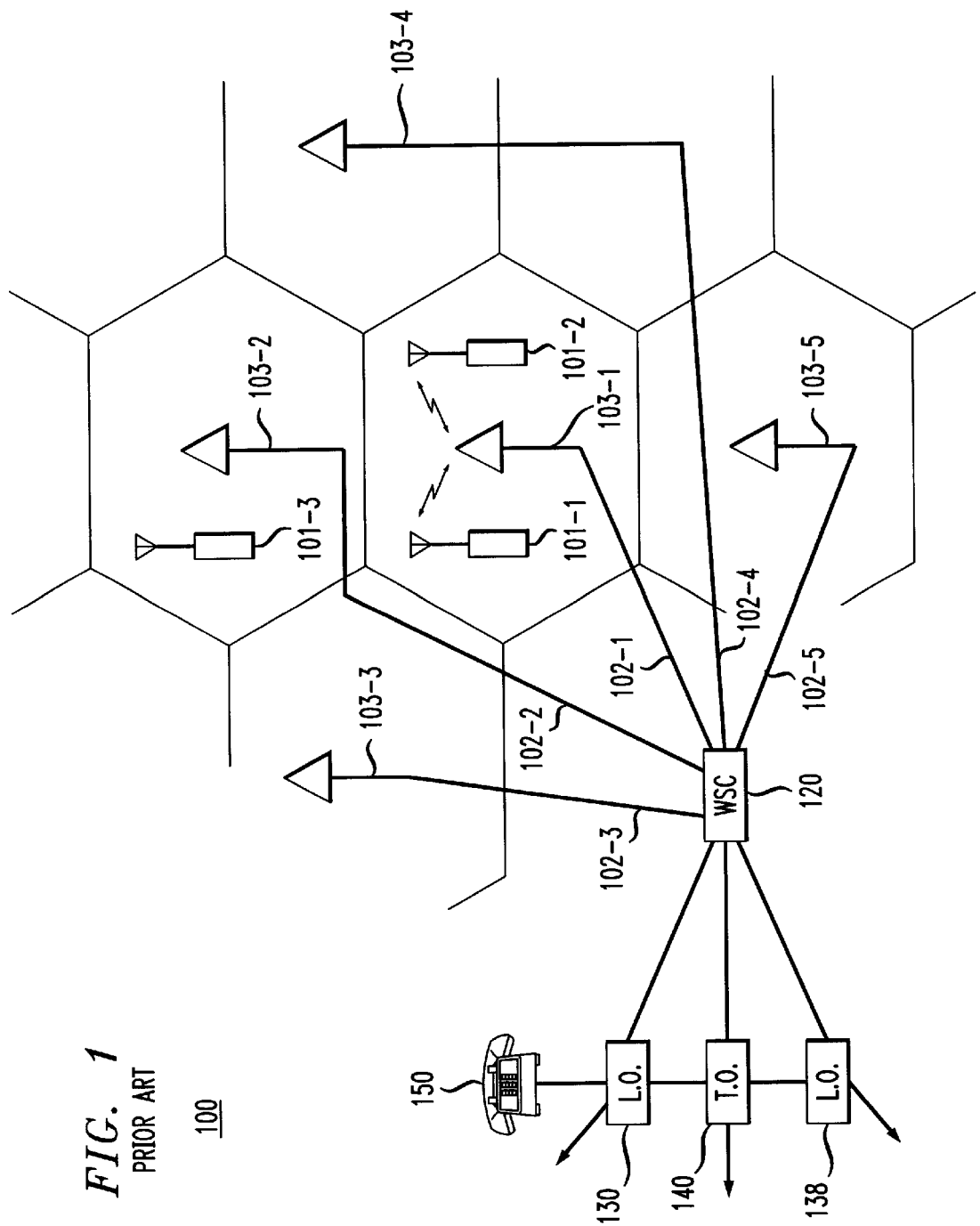
FIG. 1 depicts a schematic drawing of a wireless telecommunications in the prior art.
Figure 2:
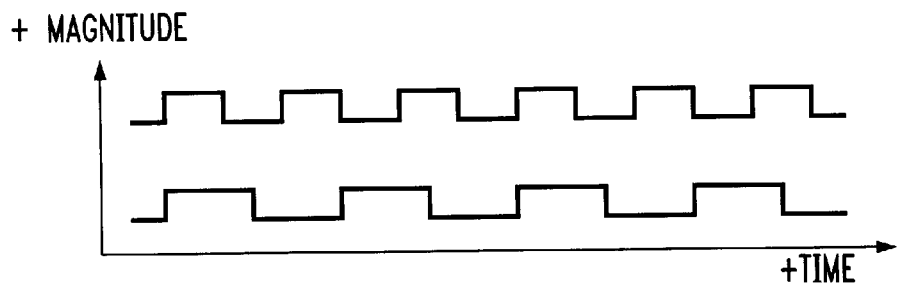
FIG. 2 depicts a graph of two timing signals that are asynchronous in frequency.
Figure 3:
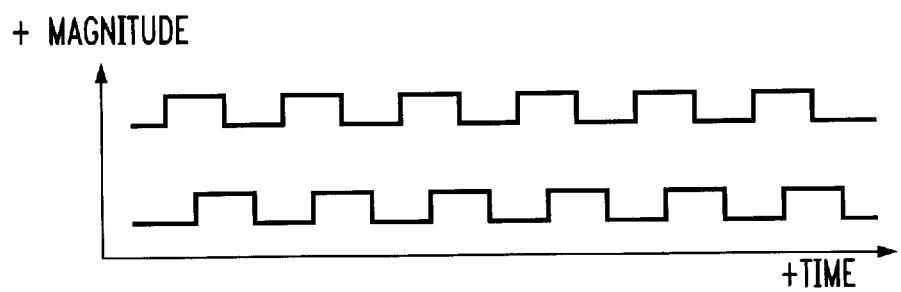
FIG. 3 depicts a graph of two timing signals that are synchronous in frequency, but asynchronous in phase.
Figure 4:
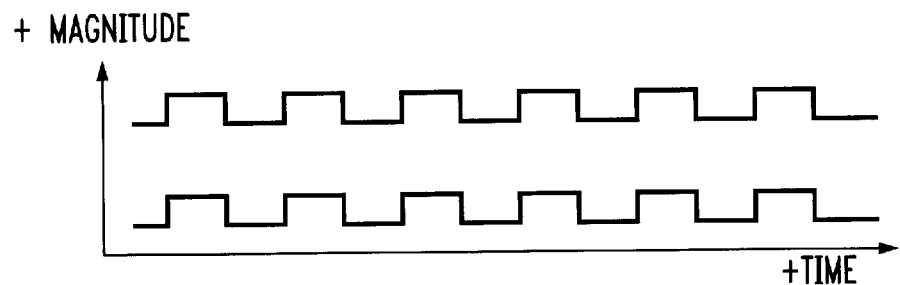
FIG. 4 depicts a graph of two timing signals that are synchronous.
Figure 5:
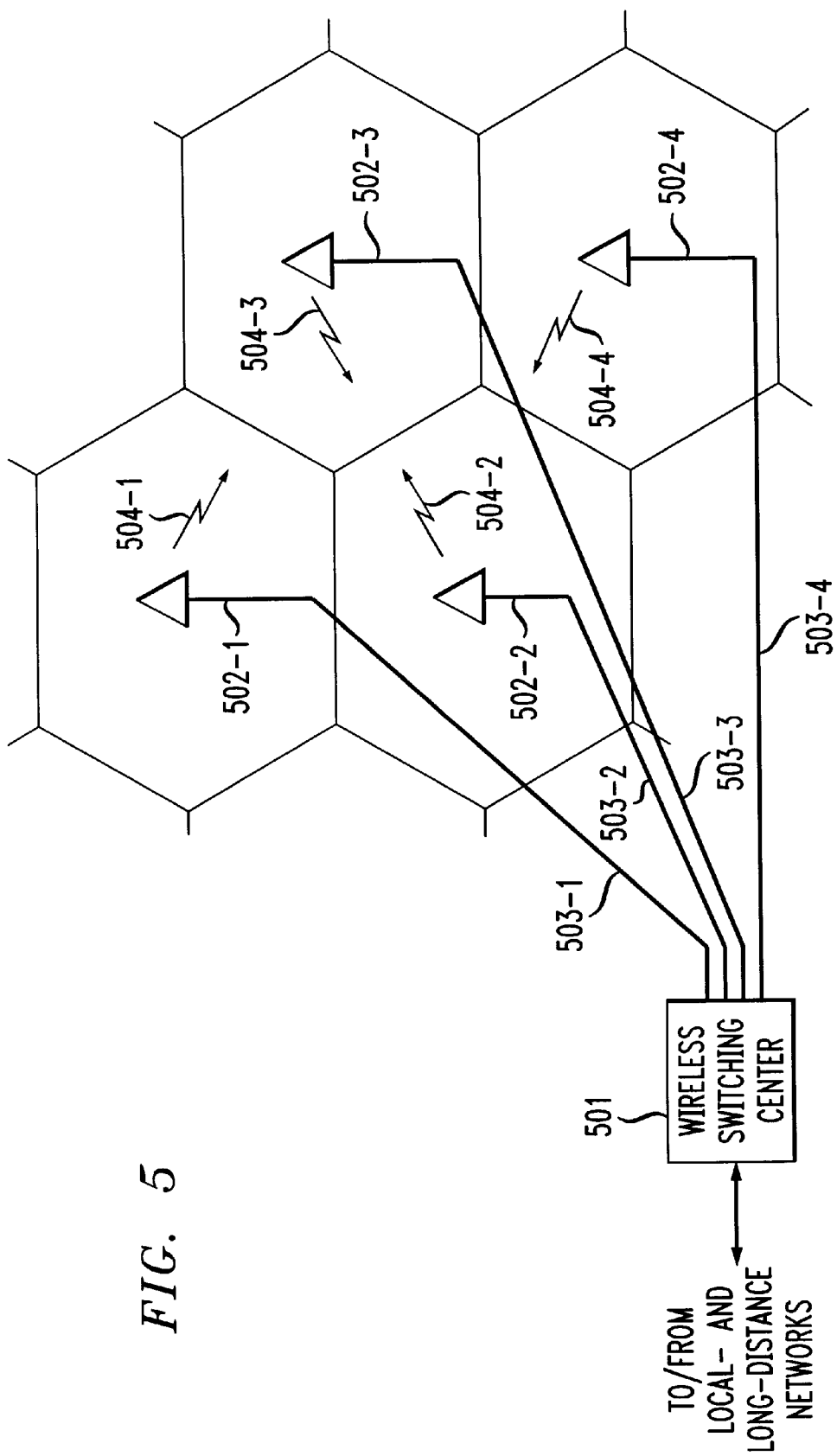
FIG. 5 depicts a schematic drawing of a portion of the illustrative embodiment of the present invention.

FIG. 5 depicts a schematic diagram of a portion of the illustrative embodiment of the present invention, which provides wireless telecommunications service to one or more wireless terminals within a geographic region. The illustrative embodiment comprises: wireless switching center 501, base stations 503-1 through 503-4, and wirelines 502-1 through 502-4, interrelated as shown. Although the illustrative embodiment comprises four base stations, it will be clear to those skilled in the art how to make and use embodiments of the present invention that comprise any number of base stations.

In accordance with the illustrative embodiment, a reference timing signal is provided to each of base stations 502-1 through 502-4. Advantageously, the reference timing signal is a periodic waveform with only two values (e.g., a square wave, etc.).

The reference timing signal can be provided to each base station by either: (1) a central timing source, or (2) a local timing source. For example, a reference timing signal can be provided to one or more base stations from a central timing source, which may be co-located with the wireless switching center and carried to the base stations via a wireline. Alternatively, a reference timing signal can be provided to a base station from a local timing source, which is co-located with the base station. It will be clear to those skilled in the art that some of the base stations can receive their reference timing signal from a central timing source while the other base stations receive their reference timing signal from local timing sources. Regardless of the source of each reference timing signal, it is important that each reference timing signal has the same frequency—it is not, however, necessary that they be synchronized in phase.

Each of base stations 502-1 through 502-4 use the reference timing signal it receives to generate a timing signal. Advantageously, the timing signal is a periodic waveform with only two values (e.g., a square wave, etc.). The details of how the timing signal is generated are discussed below in conjunction with FIG. 6.

The timing signals of the respective base stations are synchronized in both frequency and phase and have four uses:

1) each base station uses its timing signal for timing the communications with the wireless terminals it serves;
2) each base station transmits its timing signal to the wireless terminals it services for use by those wireless terminals in synchronizing their timing signals;
3) each base station transmits its timing signals to one or more nearby base stations; and
4) each base station uses the timing signals transmitted from one or more nearby base stations to generate its own timing signal.

In other words, to ensure that the timing signal generated by each base station is, in fact, synchronized (in both frequency and phase) with the timing signals generated by the other base stations, each base station advantageously generates its timing signal based on:

1) the frequency of its own reference timing signal,
2) the phase of its own timing signal, and
3) the phase of the timing signals received from one or more nearby base stations.

Figure 6:
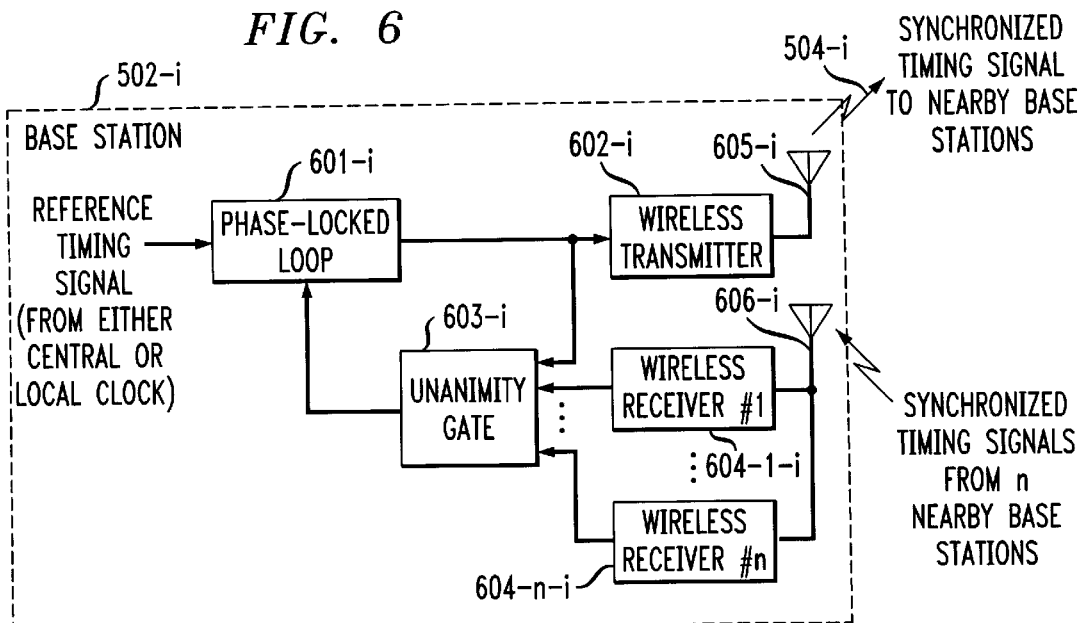
FIG. 6 depicts a block diagram of the salient components of a base station in accordance with the illustrative embodiment of the present invention.
Figure 7:
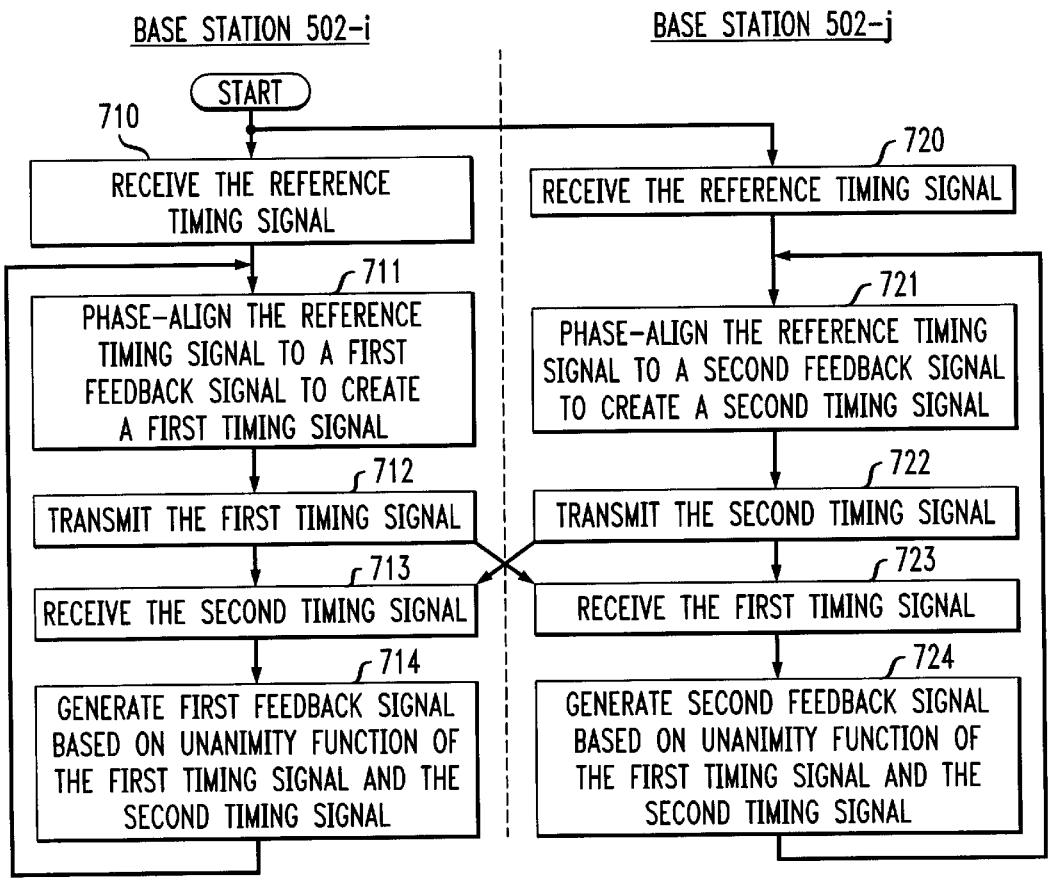
FIG. 7 depicts a flowchart of the operation of the illustrative embodiment of the present invention.
Figure 8:
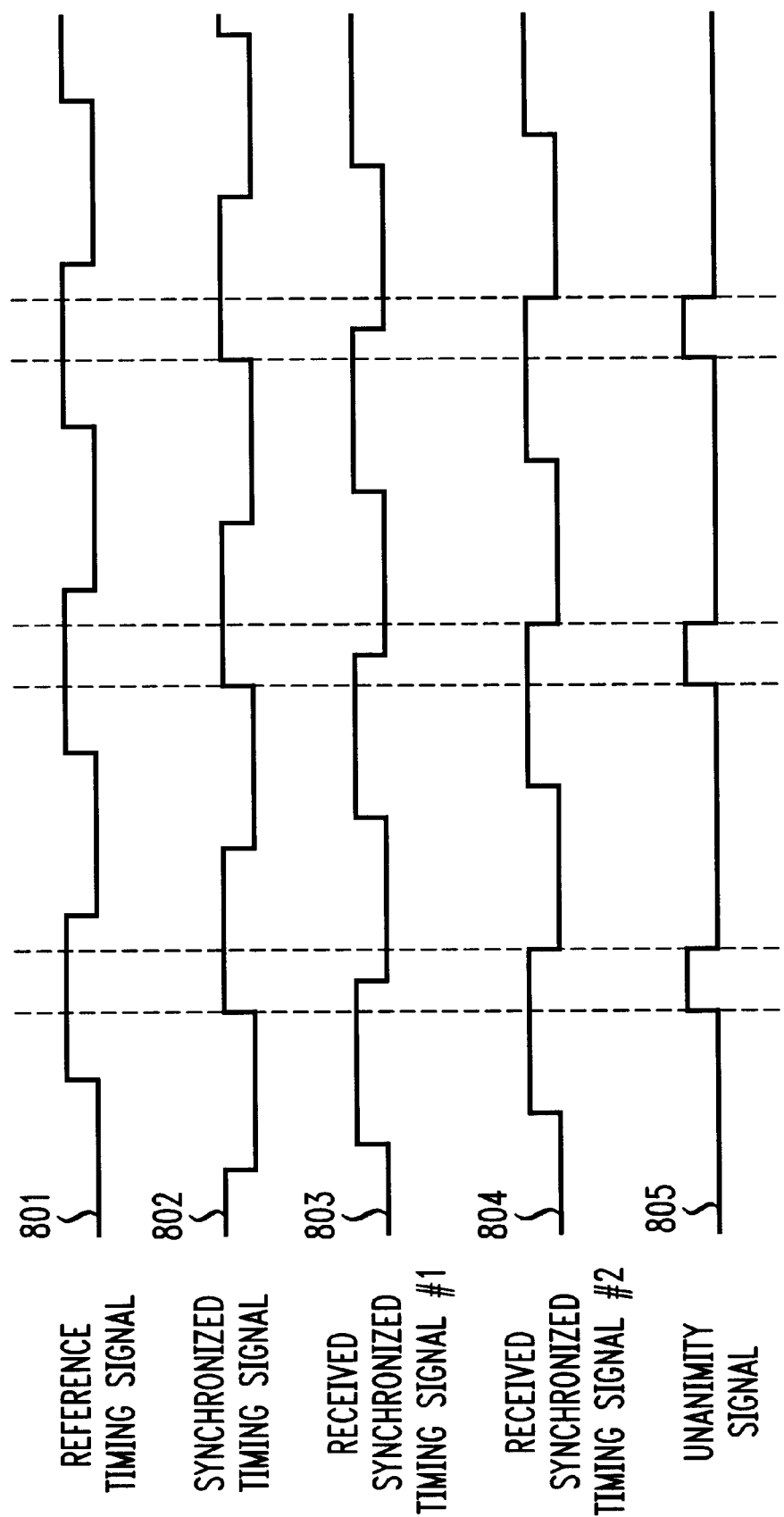
FIG. 8 depicts a graph of the salient signals and their interrelationship in the illustrative embodiment of the present invention.

The following description, in conjunction with FIGS. 6 through 8, discusses how each base station generates its timing signal.

FIG. 6 depicts a block diagram of the salient components of base station 502-i, for i=1 to 4, which advantageously comprises: phase-locked loop 601, wireless transmitter 602, unanimity gate 603, wireless receivers 604-1 through 604-n, transmit antenna 605, and receive antenna 606, interconnected as shown. The function of these components is described first, and then their operation and interrelationship is described in conjunction with FIGS. 7 and 8.

Phase-locked loop 601 receives two inputs: (1) a reference timing signal on lead 503-i, and (2) a feedback signal from unanimity gate 603. Phase-locked loop 601 phase aligns the reference timing signal to the feedback signal, in well-known fashion, to create the timing signal. The timing signal from phase-locked loop 601 is fed into wireless transmitter 602 and to one input of unanimity gate 603. The feeding of the timing signal from phase-locked loop 601 into an input of unanimity gate 603 is, which generates an input to phase-locked loop 601, is one feedback loop used by the illustrative embodiment.

Wireless transmitter 602 transmits the timing signal via transmit antenna 605, in well-known fashion, to the wireless terminals serviced by base station 503-i and to one or more nearby base stations. In an analogous manner, the nearby base stations use the timing signal transmitted by wireless transmitter 602 to generate their own timings signals, which are transmitted by them and received by receive antenna 606.

Receive antenna 606 receives the timing signals from n nearby base stations, where n≧1, and feeds the signals to wireless receivers 604-1 through 604-n. Each of wireless receivers 604-1 through 604-n outputs a timing signal from one of the n nearby base stations to unanimity gate 603.

A feedback signal from unanimity gate 603 is a Boolean function of its inputs. In particular, a feedback signal from unanimity gate 603 is true, or high, when and only when all of its inputs have the same value. For example, unanimity gate 603 can be a Boolean AND gate or a Boolean NAND gate, in well-known fashion. The use of the timing signals from other base stations, which are generated based on the timing signal of this base station, to generate the timing signal of this base station is the second feedback loop used by the illustrative embodiment.

FIG. 7 depicts a flowchart of the operation of the illustrative embodiment, which synchronizes the timing signals of two base stations: base station 502-i and base station 502-j.

At step 710, base station 503-i receives a first reference timing signal, as discussed above, in well-known fashion.

At step 711, the first reference timing signal is phase aligned with phase-locked loop 601-i to a feedback signal from unanimity gate 603-i, as discussed above. The output of the phase-locked loop 601-i is the timing signal for base station 503-i and is fed to unanimity gate 603-i and wireless transmitter 602-i. It will be clear to those skilled in the art how to make and use phase-locked loop 601-i.

At step 712, wireless transmitter 602-i transmits the timing signal via transmit antenna 605-i to one or more nearby base stations (e.g., base station 502-j), in well-known fashion.

At step 713, base station 503-i receives n timing signals from n nearby base stations (e.g., base station 502-j), via n separate control channels, in well-known fashion. For example, in accordance with most air-interface standards (e.g., IS-41, IS-56, IS-95, GSM, etc.) each base station transmits a timing signal in a control channel for the benefit of the wireless terminals that it services. This timing signal is, as is described above, used by the wireless terminals for synchronizing their own clocks to that of the base station.

The timing signal is transmitted by the base station in a control channel. A control channel is analogous to a traffic channel except that it is used for transmitting timing and other control information instead of telecommunications traffic. Furthermore, the control channels from different base stations are distinguishable from each other in that same manner that the traffic channels from different base stations are distinguishable from each other (i.e., the control channels are distinguishable by frequency, time, or orthogonal code).

Because each base station 503-i is capable of receiving n timing signals from n nearby base stations in n control channels, base station 503-i directs each of wireless receivers 604-1 through 604-n to receive and demodulate one of the n incoming timing signals and to provide it to unanimity gate 603-i. It will be clear to those skilled in the art how to make and use base station 503-i so that it receives n timing signals from n other base stations.

At step 714, the timing signal from phase-locked loop 601-i is input to unanimity gate 603-i with the n timing signals from n other base stations. The feedback signal from unanimity gate 603-i is used in step 711, as discussed above.

At step 720, base station 503-j receives a second reference timing signal, as discussed above, in well-known fashion.

At step 721, the second reference timing signal is phase aligned with phase-locked loop 601-j to a feedback signal from unanimity gate 603-j, as discussed above. The output of the phase-locked loop 601-j is the timing signal for base station 503-j and is fed to unanimity gate 603-j and wireless transmitter 602-j. It will be clear to those skilled in the art how to make and use phase-locked loop 601-j.

At step 722, wireless transmitter 602-j transmits the timing signal via transmit antenna 605-j to one or more nearby base stations (e.g., base station 502-i), in well-known fashion.

At step 723, base station 503-j receives n timing signals from n nearby base stations (e.g., base station 502-i), via n separate control channels, in well-known fashion. For example, in accordance with most air-interface standards (e.g., IS-41, IS-56, IS-95, GSM, etc.) each base station transmits a timing signal in a control channel for the benefit of the wireless terminals that it services. This timing signal is, as is described above, used by the wireless terminals for synchronizing their own clocks to that of the base station.

The timing signal is transmitted by the base station in a control channel. A control channel is analogous to a traffic channel except that it is used for transmitting timing and other control information instead of telecommunications traffic. Furthermore, the control channels from different base stations are distinguishable from each other in that same manner that the traffic channels from different base stations are distinguishable from each other (i.e., the control channels are distinguishable by frequency, time, or orthogonal code).

Because each base station 503-j is capable of receiving n timing signals from n nearby base stations in n control channels, base station 503-j directs each of wireless receivers 604-1 through 604-n to receive and demodulate one of the n incoming timing signals and to provide it to unanimity gate 603-j. It will be clear to those skilled in the art how to make and use base station 503-j so that it receives n timing signals from n other base stations.

At step 724, the timing signal from phase-locked loop 601-j is input to unanimity gate 603-j with the n timing signals from n other base stations. The feedback signal from unanimity gate 603-j is used in step 721, as discussed above.

As the steps in FIG. 7 are performed at all of the base stations throughout the illustrative embodiment, each base station's timing signal becomes synchronized, and will remain synchronized, to every other base station's timing signal.

FIG. 8 depicts a series of timing signals associated with one base station that help in understanding the illustrative embodiment of the present invention. Signal 801 illustrates a reference timing signal as input to phase-locked loop 601-i. Signal 802 illustrates the timing signal output from phase-locked loop 601-i, which is phase aligned with the leading edge of signal 805, which is a feedback signal from unanimity gate 603-i. Signals 803 and 804 represent timing signals received from other base stations and signal 805 is a Boolean AND function of the output of phase-locked loop 601-i and the timing signals received from the other base stations.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:

phase aligning a first reference timing signal to a first feedback signal to create a first timing signal; and generating said first feedback signal based on a unanimity function of said first timing signal and a second timing signal.

2. The method of claim 1 further comprising:

transmitting said first timing signal to a remote base station; and receiving said second timing signal from said remote base station.

3. The method of claim 1 further comprising:

transmitting said first timing signal to a remote base station via a first wireless channel; and receiving said second timing signal from said remote base station via a second wireless channel.

4. The method of claim 1 further comprising:

phase aligning a second reference timing signal to a second feedback signal to create said second timing signal; and generating said second feedback signal based on a unanimity function of said first timing signal and said second timing signal.

5. The method of claim 1 wherein said unanimity function is the AND function.

6. The method of claim 1 wherein said unanimity function is the NAND function.

7. The method of claim 1 wherein the step of phase aligning said first reference timing signal is performed with a phase-locked loop.

8. An apparatus comprising:

a first phase-locked loop for phase aligning a first reference timing signal to a first feedback signal to create a first timing signal; and a first unanimity gate for generating said first feedback signal based on said first timing signal and a second timing signal.

9. The apparatus of claim 8 further comprising:

a first transmitter for transmitting said first timing signal to a remote base station; and a first receiver for receiving said second timing signal from said remote base station.

10. The apparatus of claim 8 further comprising:

a first wireless transmitter for transmitting said first timing signal to a remote base station via a first wireless channel; and a first wireless receiver for receiving said second timing signal from said remote base station via a second wireless channel.

11. The apparatus of claim 8 further comprising:

a second phase-locked loop for phase aligning a second reference timing signal to a second feedback signal to create said second timing signal; and a second unanimity gate for generating said second feedback signal based on said first timing signal and said second timing signal.

12. The apparatus of claim 8 wherein said unanimity gate is an AND gate.

13. The apparatus of claim 8 wherein said unanimity gate is an NAND gate.

14. A wireless telecommunications system comprising:
   a first base station comprising:
      (i) a first phase-locked loop for phase aligning a first reference timing signal to a first feedback signal to create a first timing signal, and
      (ii) a first unanimity gate for generating said first feedback signal based on said first timing signal and a second timing signal; and
   a second base station comprising:
      (i) a second phase-locked loop for phase aligning a second reference timing signal to a second feedback signal to create said second timing signal, and
      (ii) a second unanimity gate for generating said second feedback signal based on said first timing signal and said second timing signal.

15. The wireless telecommunications system of claim 14 further comprising:
   a wireless switching center comprising:
      (i) a timing signal generator for generating said first reference timing signal and said second reference timing signal,
      (ii) a first transmitter for transmitting said first reference timing signal to said first base station via a first wireline, and
      (iii) a second transmitter for transmitting said second reference timing signal to said second base station via a second wireline.

16. The wireless telecommunications system of claim 14 wherein:
   said first base station further comprises:
      (iii) a first wireless transmitter for transmitting said first timing signal to said second base station via a first wireless channel; and
      (iv) a first wireless receiver for receiving said second timing signal from said second base station via a second wireless channel; and
   said second base station further comprises:
      (iii) a second wireless transmitter for transmitting said second timing signal to said first base station via said second wireless channel; and
      (iv) a second wireless receiver for receiving said second timing signal from said second base station via said first wireless channel.

17. The wireless telecommunications system of claim 14 wherein said first unanimity gate comprises a first AND gate, and said second unanimity gate comprises a second AND gate.

18. The wireless telecommunications system of claim 14 wherein said first unanimity gate comprises a first NAND gate, and said second unanimity gate comprises a second NAND gate.

\* \* \* \* \*